United States Patent [11] 3,634,833

[72] Inventors Roger S. Dunn
Los Angeles;
Michael Leo Canning, Sunnyvale, both of Calif.; Gerald E. Jeansonne, Richardson, Tex.

[21] Appl. No. 18,970
[22] Filed Mar. 12, 1970
[45] Patented Jan. 11, 1972
[73] Assignee Texas Instruments Incorporated
Dallas, Tex.

[54] ASSOCIATIVE MEMORY CIRCUIT
8 Claims, 3 Drawing Figs.

[52] U.S. Cl. .......... 340/173FF, 340/173 R, 340/173 AM
[51] Int. Cl. .......... G11c 11/40, H03k 3/286
[50] Field of Search .......... 340/173 AM

[56] References Cited
UNITED STATES PATENTS

| | | | |
|---|---|---|---|
| 3,427,598 | 2/1969 | Kubinec | 340/173 |
| 3,423,737 | 1/1969 | Harper | 340/173 |
| 3,436,738 | 4/1969 | Martin | 340/173 |
| 3,339,181 | 8/1967 | Singleton et al. | 340/173 |
| 3,483,528 | 12/1969 | Koerner | 340/173 |
| 3,500,340 | 3/1970 | Koerner et al. | 340/173 |

*Primary Examiner*—Terrell W. Fears
*Attorneys*—Samuel M. Mims, Jr., James O. Dixon, Andrew M. Hassell, Harold Levine, Melvin Sharp, Michael A. Sileo, Henry T. Olsen, John E. Vandigriff and Gary C. Honeycutt

ABSTRACT: An associative memory circuit suitable for integrated circuit fabrication, using multiemitter transistor logic techniques employs base-to-collector cross-coupled, bistable multivibrators to provide better memory cells with fewer components. In a circuit comprised of a plurality of memory cells, each cell includes means for addressing the cell, means for writing into it, means for reading out of it, and means for indicating whether the information stored therein is equal to other reference information, coupled to various emitters of the multiemitter transistors.

INVENTOR
ROGER S. DUNN
MICHAEL L. CANNING
GERALD E. JEANSONNE
BY Henry T. Olsen
ATTORNEY

ASSOCIATIVE MEMORY CIRCUIT

This invention relates generally to associative memory circuits wherein binary data or information is stored, retrieved and compared with other binary data, and more particularly to integrated circuit associative memories which employ multiemitter transistors, base-to-collector cross-coupled, forming bistable multivibrators.

Sorting and filing problems, matching and compare operations and bulk processing in computers can be most efficiently handled by an associative or content addressable memory circuit. The associative memory circuit must be capable of being set and reset, written into, read out of and indicative of whether the information stored therein is equal to other information supplied to a reference information input.

Since the state of the art in the computer industry is tending toward the exclusive utilization of integrated circuits in computer fabrications, it is desirable to provide a simplified associative memory circuit with a minimum number of components which can be easily fabricated into semiconductor integrated form. Existing associative memory circuits use a large number of components which, because of their relative values, are not easily fabricated into semiconductor integrated circuits. Hence, a compact and efficient circuit which can be fabricated as an integrated circuit is required which is capable of both storing and retrieving binary information (as in a bistable) and performing the "compare" or "match" operation.

It is therefore an object of the invention to provide a high-speed, compact memory circuit with a minimum of components which is capable of being set and reset, written into, read out of and indicative of whether the information stored therein is equal to other information supplied to a reference information input.

Another object of the invention is to provide an associative memory circuit which is capable of being easily fabricated as a semiconductor integrated circuit.

A further object of the invention is to provide an associative memory circuit implemented with multiemitter transistor-transistor logic techniques.

These and other objects are accomplished in accordance with the invention by providing a memory circuit with base-to-collector cross-coupled, multiemitter transistors forming bistable multivibrator memory cells with emitter-gated logic inputs and outputs. A complete memory circuit is comprised of a plurality of such memory cells arranged in a matrix of columns of words and rows of bits. Each cell is provided with means for selection of the particular cell, means for writing into it, means for reading out of it and means for comparing the information stored therein to other information supplied to a reference information input.

The direct cross-coupled transistor configuration allows base driving current to be at a level just slightly lower than collector current and hence, transistors with a relatively low $h_{FE}$ are used. Consequently, very wide tolerance resistors are used to couple the collector contacts of the transistors to a supply voltage. Because of the wide tolerance in resistors and the low $h_{FE}$ transistors, fabrication of the memory as a semiconductor integrated circuit is relatively easy.

Other objects and advantages of the invention will be apparent from the detailed description of the claims and from the accompanying drawings illustrative of the invention wherein:

The associative memory circuit of the invention has a plurality of memory cells arranged in a matrix of columns of words and rows of bits for storing, retrieving and comparing binary information of less than 100 nanoseconds. Each memory cell is comprised of a transistorized single or dual-stage stable multivibrator, input means for addressing the cell, input means for writing binary information into the cell, output means for reading information out of the cell, and means for comparing binary information stored in the cell to other reference binary information. Characteristically, the means for addressing the cell is comprised of column input means for addressing a binary word and row input means for selecting or selectively programming an individual bit of the addressed word. The means for comparing the binary information stored in the cell to other binary information is characteristically comprised of input means for introducing the reference information into an addressed cell and output means for determining whether the binary information stored in the cell is equivalent to the reference information.

Figure 1:
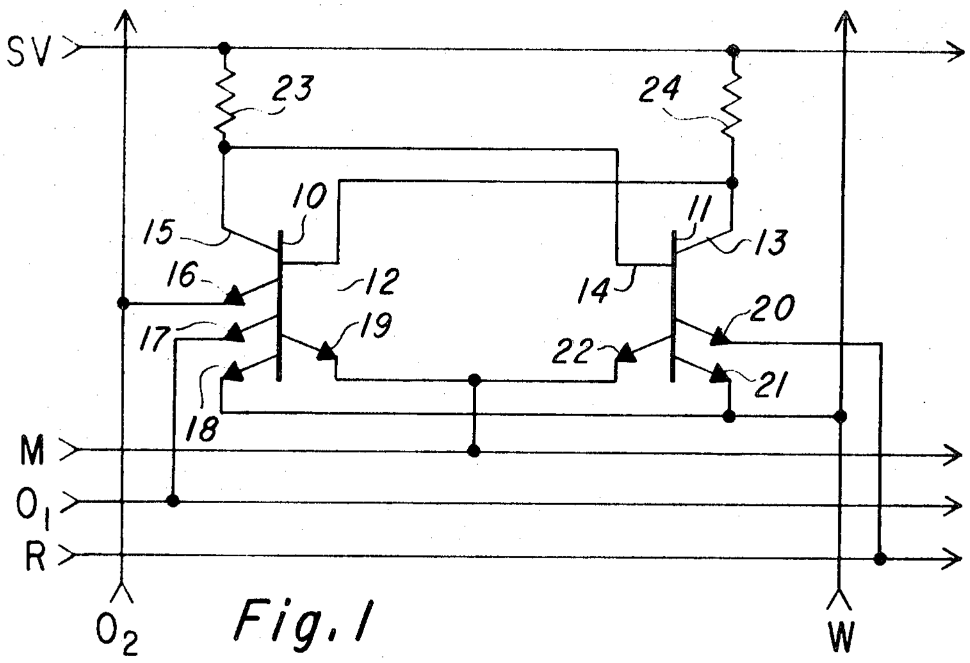
FIG. 1 is a first embodiment of the invention.

Three embodiments of the invention which are easily fabricated as integrated circuits are now described in detail. The first of these embodiments is illustrated in FIG. 1.

A memory cell of this first embodiment is comprised of a single-stage transistorized bistable multivibrator having two transistors 10 and 11, each with a base contact, a collector contact and a plurality of emitter contacts. Base contact 12 of transistor 10 is cross-coupled to collector contact 13 of transistor 11 and base contact 14 of transistor 11 is cross-coupled to collector contact 15 of transistor 10.

Emitter contacts 16, 17, 18 and 19 of transistor 10 and emitter contacts 20, 21 and 22 of transistor 11 provide the input and output means of the memory cell. Essentially, these input and output means are comprised of column input means W for addressing a word, row input means R for selectively programming an individual cell representing a bit of the addressed word to perform a binary function such as read, write or compare, output means $0_1$ for reading binary information out of the selected cell, input means M for introducing other reference binary information into the memory cell and output means $0_2$ for determining whether the binary information stored in the memory cell is equivalent to the reference information.

Although transistors 10 and 11 are shown as NPN-devices, PNP-transistors may be used equally as well. Resistors 23 and 24 provide means for coupling collector contacts 15 and 13 respectively, to a collector voltage supply (for example, 5 volts) at terminal SV.

The memory cell is addressed by applying a relatively high voltage (for example, 2.2–5 volts) to column input means W coupled to emitters 18 and 21 thereby selecting a binary word. An individual cell representing a bit of the binary work is selected and programmed simultaneously by applying a voltage to row input means R coupled to emitter 20.

The relatively high voltage is applied to input means M coupled to emitters 19 and 22 during all programmed modes of operation except during a special nonmatch or noncompare mode.

A first output means $0_1$ coupled to emitter 17 is used for reading binary information out of a selected cell, and a second output means $0_2$ coupled to emitter 16 is used for determining whether the binary information stored in the memory cell is equivalent to the reference binary information applied to input means M which in this embodiment is always a binary "1" during the match or compare mode.

Thus, the cell is programmed by applying the relatively high voltage to either output means $0_1$ or $0_2$ and applying a selected voltage to input means R. When, for example, the relatively high voltage is applied to input means R and output means $0_2$ and a reference voltage (for example, 1.0–1.3 volts) is applied to output means $0_1$, a binary "1" is written into the memory cell. When the relatively high voltage is applied to output means $0_2$ and the reference voltage is applied to output means $0_1$, but a relatively low voltage (for example, 0.3 volts) is applied to input means R, then a binary "0" will be written into the cell.

In order to read or retrieve the information stored in the cell, the relatively high voltage is applied to output means $0_2$ and the reference voltage is applied to output means $0_1$ and input means R. If a binary "1" is stored in the cell, additional current will be sensed on output means $0_1$.

In the compare or match mode, the relatively high voltage is applied to output means $0_1$ and the reference voltage is applied to input means R and output means $O_2$. If the information stored in the memory cell is equivalent to or matches the binary "1" applied to input means M, additional current is sensed on output means $0_2$.

A noncompare mode in which no additional current is sensed on output means $0_2$ is programmed when voltages are applied as above for a compare mode but the reference voltage is applied to input means M.

Figure 2:
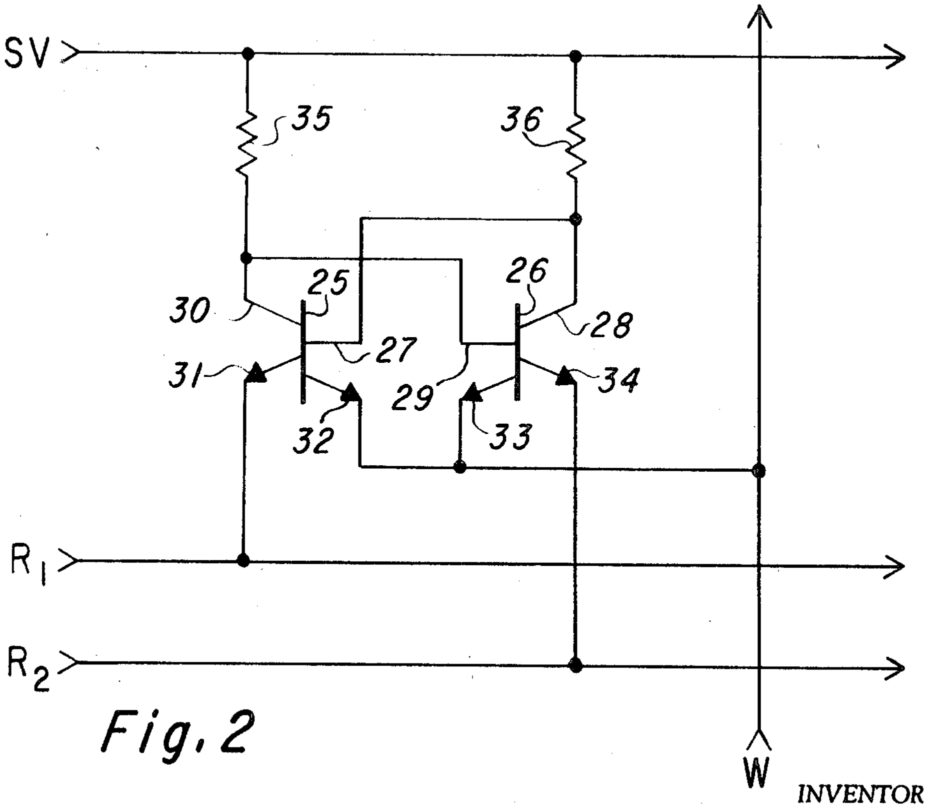
FIG. 2 is a second embodiment of the memory circuit of the invention.

The second embodiment of the invention is illustrated in FIG. 2. A memory cell of this embodiment requires only three input-output means and is comprised of a single transistorized bistable multivibrator having two transistors 25 and 26, each with a base contact, a collector contact and a plurality of emitter contacts. Base contact 27 of transistor 25 is cross-coupled to collector contact 28 of transistor 26 and base contact 29 of transistor 26 is cross-coupled to collector contact 30 of transistor 25. Emitter contacts 31 and 32 of transistor 25 and emitter contacts 33 and 34 of transistor 26 provide the input and output or input-output means of the memory cell.

The input and output means of each memory cell of this second embodiment of the invention are comprised of column input-output means W coupled to emitters 32 and 33 for addressing a word and retrieving information from a programmed cell in the word and first and second row input-output means $R_1$ and $R_2$ coupled respectively to emitters 31 and 34 for selectively programming and retrieving information from the individual cell representing a bit of the addressed word.

Resistors 35 and 36 provide means for coupling collector contacts 30 and 28 respectively to a collector voltage supply (typically 5 volts) at terminal SV.

The memory cell is addressed and programmed simultaneously by selectively applying different voltages to the three input-output means W, $R_1$ and $R_2$. In this particular embodiment, four voltages are employed: a relatively high voltage (for example, 2.2–5 volts), a relatively low voltage (for example, 0.03 volts), a first reference voltage (for example, 1.0–1.3 volts) and a second reference voltage (for example, 0.15 volts more than the first reference voltage).

Thus, when the relatively low voltage is applied to column input-output means W, and the first reference voltage is applied to both the first and second row input means $R_1$ and $R_2$, a nonselect mode is programmed and the cell will not be addressed. With the first reference voltage applied to the first and second row input means $R_1$ and $R_2$, the relatively high voltage applied to column input-output means W will program the cell in a read mode. If a binary "1" is stored in the cell, additional current will be sensed from row input-output means $R_1$, or if a binary "0" is stored in the cell, additional current will be sensed from row input-output means $R_2$.

In order to write a binary "1" into the cell, the relatively high voltage is applied to both column input-output means W and second row input-output means $R_2$, and either the relatively low voltage or the first reference voltage is applied to first row input-output means $R_1$. A binary "0" is written into the cell by applying the relatively high voltage to input-output means W and input-output means $R_1$ and the first reference voltage or relatively low voltage to input-output means $R_2$.

To program the compare or match mode of operation, the second reference voltage is applied to column input-output means W. When the relatively high voltage is applied to row input-output means $R_1$ and the first reference voltage is applied to row input-output means $R_2$, no current is sensed on input-output means W if the information stored in the memory cell matches a binary "0." When, however, the relatively high voltage is applied to row input-output means $R_2$ and the first reference voltage is applied to row input-output means $R_1$, no current is sensed on input-output means W if the information stored in the memory cell matches a binary "1."

Figure 3:
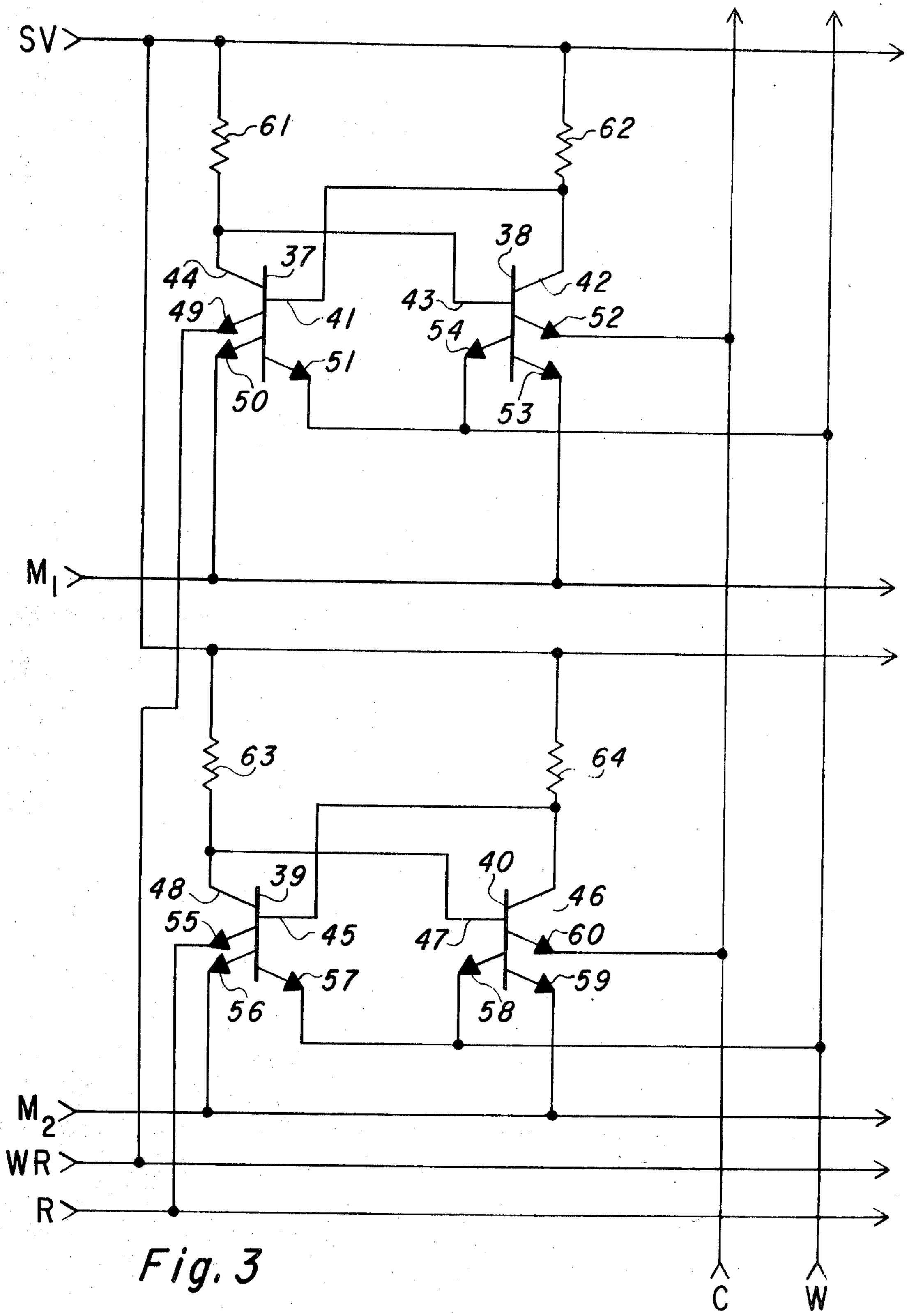
FIG. 3 is yet a third embodiment of the circuit of the invention.

A third embodiment of the invention, as illustrated in FIG. 3, is comprised of a dual bistable multivibrator providing a wide noise margin. The dual multivibrator is comprised of four transistors 37, 38, 39 and 40, each transistor having a base contact, a collector contact and a plurality of emitter contacts. Base contact 41 of transistor 37 is cross-coupled to collector contact 42 to transistor 38; base contact 43 of transistor 38 is cross-coupled to collector contact 44 of transistor 37; base contact 45 of transistor 39 is cross-coupled to collector contact 46 of transistor 40; and base contact 47 of transistor 40 is cross-coupled to collector contact 48 of transistor 39. Resistors 61 and 62 are employed to couple collectors 44 and 42 respectively to a voltage supply (typically 5 volts) connected at terminal SV.

Emitter contacts 55, 56 and 57 of transistor 39 and emitter contacts 58, 59 and 60 of transistor 40 provide the input and output means of the memory cell.

The input and output means of the memory cell of this third embodiment of the invention are comprised of column input means W for addressing a word coupled to emitters 51, 54, 57 and 58, row input-output means R for selectively programming an individual cell representing a bit of the addressed word and reading information out of the cell coupled to emitter 55, input means WR for writing binary information into the cell coupled to emitter 49, input means $M_1$ and $M_2$ for introducing other binary information or reference information into the memory cell coupled to 50 and 53 and to 56 and 59 respectively and output means C for determining whether the binary information stored in the memory cell is equivalent to the reference information coupled to emitters 52 and 60.

As with the memory cell of the first embodiment of the invention described above, the memory cell of this third embodiment operates by applying three different voltages to the various input and output means of the cell. The three voltages employed are a relatively low voltage (typically 0.3 volts), a relatively high voltage (typically 2.2–5 volts) and a reference voltage which is intermediate the relatively high and low voltages (typically 1.0–1.3 volts).

The cell is addressed by applying the relatively high voltage to column input means W.

The read mode of operation is programmed by applying the relatively high voltage to input means $M_1$ and $M_2$ and applying the reference voltage to row input-output means R, output means C and input means WR. If a binary "1" is stored in the memory cell selected, additional current is sensed on input-output means R.

The write mode of operation is programmed by applying the relatively high voltage to input means $M_1$ and $M_2$ and applying the reference voltage to output means C.

A binary "0" is written into the memory cell by applying the relatively high voltage to row input-output means R and applying the relatively low voltage to input means WR. When, however, the relatively low voltage is applied to row input-output means R and the relatively high voltage is applied to input means WR a binary "1" is written into, and thereby stored in the memory cell.

To program a cell for the match or compare mode of operation, the reference voltage is applied to input-output means R, input means WR and output means C. When the relatively high voltage is applied to input means $M_1$ and the relatively low voltage is applied to input means $M_2$, no current is sensed on output means C if the information stored in the cell matches a binary "1." When, however, the relatively high voltage is applied to input means $M_2$ and the relatively low voltage is applied to input means $M_1$, no current is sensed on input-output means C if the information stored in the cell matches a binary "0."

From the above-detailed description of specific preferred embodiments of the invention, it will be noted that a very simple associative memory circuit has been described which provides means for storing binary information in transistorized bistable cells, means for retrieving the stored information and means for comparing the stored information with other reference binary information. These specific embodiments are merely illustrative of the principles underlying the inventive concept, however, and various modifications of the disclosed embodiment of the invention will be apparent to persons skilled in the art.

What is claimed is:

1. In an associative memory circuit having a plurality of memory cells arranged in a matrix of columns of words and rows of bits for storing, retrieving and comparing binary information, a memory cell comprised of:

a. a transistorized bistable multivibrator;
b. input means for addressing the cell;
c. input means for writing binary information into the cell;
d. output means for reading binary information out of the cell;
e. means for comparing binary information stored in the cell to other binary information; wherein
f. the transistorized bistable multivibrator is comprised of four transistors each having a base contact, a collector contact and a plurality of emitter contacts interconnected to form two stages, the base contact of the first transistor being cross-coupled to the collector contact of the second transistor, the base contact of said second transistor being cross-coupled to the collector contact of said first transistor, the base contact of the third transistor being cross-coupled to the collector contact of the fourth transistor, the base contact of said fourth transistor being cross-coupled to the collector contact of said third transistor and the emitter contacts of said transistors providing the input and output means of said cells.

2. The memory cell of claim 1 including means for coupling the collector contacts of each of said transistors to a collector voltage supply.

3. In an associative memory circuit having a plurality of memory cells arranged in a matrix of columns of words and rows of bits for storing, retrieving and comparing binary information, a memory cell comprised of a transistorized bistable multivibrator comprised of first and second transistors each having a base contact, a collector contact and a plurality of emitter contacts, the base contact of said first transistor being cross-coupled to the collector contact of said second transistor, the base contact of said second transistor being cross-coupled to the collector contact of said first transistor and the emitter contacts of said transistors providing input and output means of said cells comprising:

a. column input means for addressing a word;
b. row input means for selectively programming an individual cell representing a bit of the addressed word to perform a binary function;
c. output means for reading binary information out of said selected cell;
d. input means for introducing other binary information into said memory cell;
e. output means for determining whether the binary information stored in said memory cell is equivalent to said other information;
f. means for applying a relatively low voltage to selected ones of said plurality of emitters representing a binary "0";g. means for applying a relatively high voltage to other selected ones of said plurality of emitters representing a binary "1"; and
h. means for applying a reference voltage intermediate said low voltage and said high voltage to remaining ones of said plurality of emitters, whereby a current appears on one of said remaining emitters if the binary function is a binary "1."

4. The memory cell of claim 3 including means for coupling the collector contacts of each of said transistors to a collector voltage supply.

5. In an associative memory circuit having a plurality of memory cells arranged in a matrix of columns of words and rows of bits for storing, retrieving and comparing binary information, a memory cell comprised of a transistorized bistable multivibrator comprised of first and second transistors each having a base contact, a collector contact and a plurality of emitter contacts, the base contact of said first transistor being cross-coupled to the collector contact of said second transistor and the base contact of said second transistor being cross-coupled to the collector contact of said first transistor and the emitter contacts of said transistors providing input and output means of said cells comprising:

a. column input-output means for addressing a word and retrieving information from a cell;
b. first and second row input-output means for selectively programming and retrieving information from an individual cell representing a bit of the addressed word;
c. means for applying a relatively low voltage to selected ones of said plurality of emitters representing a binary "O";
d. means for applying a relatively high voltage to other selected ones of said plurality of emitters representing a binary "1";
e. means for applying a first reference voltage intermediate said low voltage and said high voltage to other selected ones of said plurality of emitters; and
f. means for applying a second reference voltage intermediate said first reference voltage and said high voltage to the remaining ones of said plurality of emitters, whereby a current or noncurrent condition occurs on certain ones of the emitters representing the result of a programmed function.

6. The memory cell of claim 5 including means for coupling the collector contacts of each of said transistors to a collector voltage supply.

7. In an associative memory circuit having a plurality of memory cells arranged in a matrix of columns of words and rows of bits for storing, retrieving and comparing binary information, a memory cell comprised of a transistorized dual-stage bistable multivibrator having four transistors each transistor having a base contact, a collector contact and a plurality of emitter contacts, the base contact of the first transistor being cross-coupled to the collector contact of the second transistor, the base contact of the second transistor being cross-coupled to the collector contact of the first transistor, the base contact of the third transistor being cross-coupled to the collector contact of the fourth transistor, the base contact of the fourth transistor being cross-coupled to the collector contact of the third transistor and the emitter contacts of said transistors providing input and output means of said cells comprising:

a. column input means for addressing a word;
b. row input-output means for selectively programming an individual cell representing a bit of the addressed word and reading information out of said cell;
c. input means for writing binary information into said cell;
d. input means for introducing other binary information into said memory cell;
e. output means for determining whether the binary information stored in said memory cell is equivalent to said other information;
f. means for applying a relatively low voltage to selected ones of said plurality of emitters representing a binary "0";
g. means for applying a relatively high voltage to other selected ones of said plurality of emitters representing a binary "1";
h. means for applying a reference voltage intermediate said low voltage and said high voltage to the remaining ones of said plurality of emitters, whereby a current or noncurrent condition occurs on certain ones of said remaining emitters representing the result of a programmed function.

8. The memory cell of claim 7 including means for coupling the collector contacts of each of said transistors to a collector voltage supply.

* * * * *